(12) United States Patent
Flores et al.

(10) Patent No.: US 10,324,838 B2
(45) Date of Patent: Jun. 18, 2019

(54) VIRTUALLY ADDRESSABLE HARDWARE GLOBAL KERNEL SEGMENT TABLE

(71) Applicant: International Business Machines Corporation, Armonk, NY (US)

(72) Inventors: Arnold Flores, Round Rock, TX (US); Bruce G. Mealey, Austin, TX (US); Mark D. Rogers, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 15/730,989

(22) Filed: Oct. 12, 2017

(65) Prior Publication Data
US 2019/0114259 A1   Apr. 18, 2019

(51) Int. Cl.
*G06F 12/10* (2016.01)
*G06F 12/02* (2006.01)
*G06F 12/1045* (2016.01)
*G06F 12/14* (2006.01)

(52) U.S. Cl.
CPC ...... *G06F 12/0292* (2013.01); *G06F 12/1054* (2013.01); *G06F 12/145* (2013.01); *G06F 2212/151* (2013.01); *G06F 2212/683* (2013.01)

(58) Field of Classification Search
CPC ......... G06F 12/1009; G06F 2212/1024; G06F 12/1027; G06F 3/0673; G06F 2212/68; G06F 3/0611; G06F 3/0659; G06F 13/00; G06F 2212/657; G06F 12/0292; G06F 12/1054; G06F 12/1145; G06F 2212/683; G06F 2212/151
USPC ...................................... 711/206
See application file for complete search history.

(56) References Cited

U.S. PATENT DOCUMENTS

| | | | |
|---|---|---|---|
| 5,584,005 A | 12/1996 | Miyaoku et al. | |
| 7,206,915 B2 | 4/2007 | DeSouter et al. | |
| 8,095,771 B2 | 1/2012 | Sheu et al. | |
| 8,504,795 B2 | 8/2013 | Shah et al. | |
| 2010/0125709 A1* | 5/2010 | Hall | G06F 12/1036 711/154 |

(Continued)

FOREIGN PATENT DOCUMENTS

EP   345589 A2   12/1989

OTHER PUBLICATIONS

Barr et al., "SpecTLB: A Mechanism for Speculative Address Translation", IEEE, 2011.

*Primary Examiner* — Hashem Farrokh
(74) *Attorney, Agent, or Firm* — Patterson + Sheridan, LLP

(57) ABSTRACT

Systems, methods, and computer program products to manage an address translation in a virtually segmented memory system, with included processes comprising a process scoped segment table (STAB) consisting of segment table entries (STEs) that contain effective address segment number (ESID) to system wide unique virtual segment identifier (VSID) mappings, and creating a global kernel segment table (STAB) that itself is translated using a pinned page table entry (PTE). A switch to the global kernel STAB is initiated in response to a page fault interrupt on a process STAB PTE and a PTE reload handler invoked to reload that process STAB PTE. A switch to an original STAB is initiated in order to resume the address translation and resolve the page fault or the interrupt by an operating system executing on the processor.

20 Claims, 5 Drawing Sheets

(56) References Cited

U.S. PATENT DOCUMENTS

2012/0272022 A1\* 10/2012 Wang ................... G06F 9/545
                                                                         711/162
2014/0156968 A1    6/2014 Terry et al.
2016/0283404 A1\* 9/2016 Xing ..................... G06F 21/53

\* cited by examiner

EFFECTIVE ADDRESS BIT LAYOUT 200

| EFFECTIVE SEGMENT ID (ESID) 205 | PAGE NUMBER (PNO) 210 | BYTE OFFSET 215 |
|---|---|---|

FIG. 2

VIRTUALLY ADDRESSABLE HARDWARE GLOBAL KERNEL SEGMENT TABLE

FIELD OF THE DISCLOSURE

Embodiments presented herein generally relate to computing processes, and more specifically, to resolving segment faults on computing systems.

BACKGROUND

Address translation in a virtually segmented memory system requires translating a process scoped effective address' segment number (ESID) into a system wide unique virtual segment identifier (VSID). This ESID to VSID mapping is generally provided to the processor via a segment look-aside buffer (SLB) cache located in processor itself. The SLB size is typically small since space on a processor is limited. As a result, workloads with a large number of segments require frequent SLB reloading.

SLB entries (SLBEs) are loaded from in-memory segment tables (STABs) maintained by the operating system for each running process. The SLB can either be software managed by the operating system or hardware managed by the processor.

Software management of the SLB (SSLB) involves the CPU sending an SLB miss interrupt to the operating system, which then uses an interrupt handler to find or create the STAB entry (STE) containing the appropriate ESID to VSID translation information and copy it into an SLBE. SSLB allows the operating system the flexibility to choose which SLBEs get replaced. However, the SLB miss interrupt handler can take tens to hundreds of cycles to complete.

Hardware management of the SLB (HSLB) significantly reduces the SLB replacement overhead because the CPU can directly copy the STE information into an SLBE without having to send an interrupt to the operating system unless the STE needs to be created. CPU access to the STAB can either use physical or virtual addressing. Although physical addressing is easier for the processor, it imposes some limitations on the operating system's ability to optimally manage the STAB's underlying memory.

Virtually addressing the STAB removes those limitations since the operating system is free to do things such as optimizing the STAB's memory affinity by moving it to physical memory closer to the processor that's using it. However, it introduces a new problem since the CPU will now need a hardware page table (HPT) entry (PTE) that translates the STE's virtual address into a physical address. If the PTE doesn't yet exist or has been evicted to make room for other PTEs, the CPU must send a PTE miss interrupt to the operating system requesting that PTE be reloaded. The PTE reload interrupt handler code and the internal translation tables are also accessed virtually, so the PTE reload handler may reference code/data virtual addresses whose STEs also do not have a PTE, and that will cause the CPU running the PTE reload handler to recursively send another PTE miss interrupt potentially leading to an infinite loop.

A simple solution to that circular dependency is to pin all PTEs for every process' STAB so that they cannot be evicted from the HPT. However, this solution also creates new problems. Since every pinned PTE reduces the number of a replaceable PTEs in the HPT, it is possible that may create an HPT thrashing environment where system and workload processes spend more and more of their execution time reloading their replaceable PTEs. In addition, inverted HPTs implemented as n-way associative caches could find one or more associative PTE groups (PTEGs) completely filled by pinned PTEs, and subsequent memory references that need to add a PTE to that group will deadlock because they cannot evict the pinned PTEs.

SUMMARY

Embodiments disclosed herein include systems, methods, and computer program products to manage an address translation in a virtually segmented memory system, with included processes comprising a process scoped segment table (STAB) consisting of segment table entries (STEs) that contain effective address segment number (ESID) to system wide unique virtual segment identifier (VSID) mappings, and creating a global kernel segment table (STAB) that itself is translated using a pinned page table entry (PTE). A switch to the global kernel STAB is initiated in response to a page fault interrupt on a process STAB PTE and a PTE reload handler invoked to reload that process STAB PTE. A switch to an original STAB is initiated in order to resume the address translation and resolve the page fault or the interrupt by an operating system executing on the processor.

BRIEF DESCRIPTION OF THE SEVERAL VIEWS OF THE DRAWINGS

FIG. 2 illustrates an example layout of an effective address, according to one embodiment.

DETAILED DESCRIPTION

Figure 1:
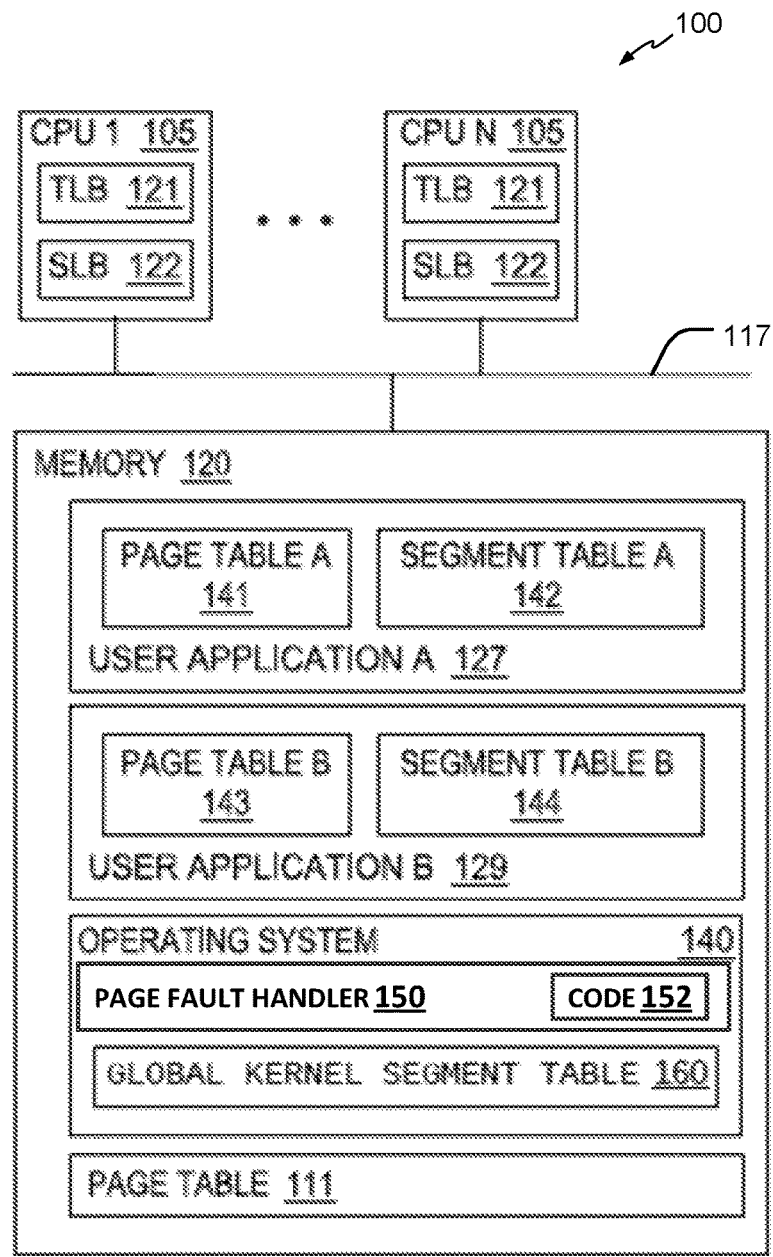
FIG. 1 illustrates an example computing system configured with process scoped segment tables and a global kernel segment table, according to one embodiment.
Figure 3:
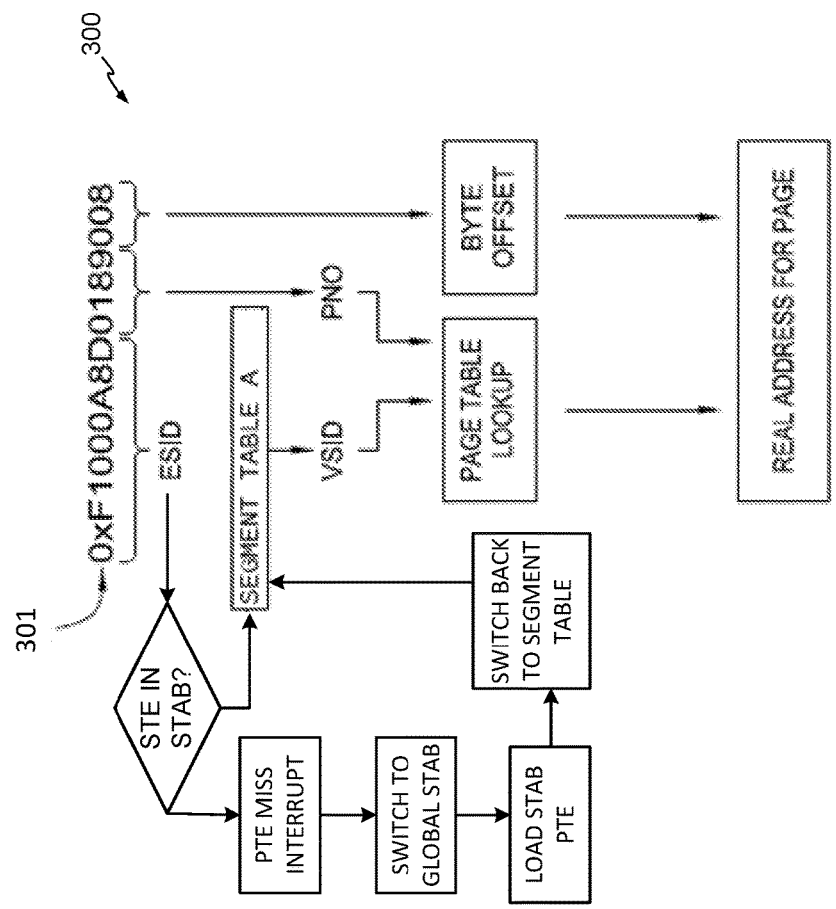
FIG. 3 illustrates an example flow of translating an effective address to a real address, according to one embodiment.

An apparatus and method described herein exploit a virtually addressable hardware global kernel segment table (STAB) in such a manner as to avoid that circular dependency efficiently without resorting to page table entry (PTE) pinning every STAB. An address translation method in a virtually segmented memory system includes creating a single PTE pinned global kernel STAB. The global kernel STAB includes the effective address' segment number (ESID) to a system wide unique virtual segment identifier (VSID) segment table entries (STEs) of global kernel data used by a PTE reload handler. The PTE reload handler may switch to the PTE pinned global kernel STAB when needed. The system may include a small amount of code to a first portion of the PTE reload interrupt handler before it has enabled virtual page translation for the rest of the PTE reload interrupt handler. The added code may detect whether the interrupt was generated for a STAB PTE miss and whether it occurred while running the PTE reload interrupt handler, itself.

In operation, the system may detect a STAB PTE miss, and in response, switch to the global kernel STAB. The system may load the original STAB PTE and switch back to the original STAB. The system may then resume the original address translation. More particularly, a processor in the system may search the STAB for an STE that maps the ESID to its corresponding VSID. In an embodiment, the STAB references are performed by the processor using virtual addressing. As such, the processor may use the STAB's VSID and virtual page number (PNO). For instance, the system may search the VSID and PNO from within a system wide page translation table to determine the STAB's physical address. When the STAB does not have an entry in the page table, the CPU must issue a PTE miss interrupt to the operating system (O/S) so that the O/S can load the STAB's PTE. The O/S code that loads the STAB's PTEs operates with address translation enabled in order to search the virtual machine manager (VMM) information (including the STAB's VSID/PNO and physical address) used to set up the STAB PTE. As such, the PTE reload code may also need the STAB whose PTE it needs to reload.

One embodiment may PTE pin every STAB page. However, page table space may be limited and a very critical system resource, so pinning may add operating system complexity and management challenges.

Another embodiment of the system includes a single global kernel STAB whose PTEs are pinned. This special STAB is only used in a very small number of critical code paths that cannot handle a STAB PTE miss and so only contains the ESID and VSID STEs needed by those paths. An example of these code paths is the case mentioned above where the processor issues a PTE miss interrupt for a STAB entry. Early in the PTE miss interrupt handler code, before translation is re-enabled (e.g., after being disabled by an interrupt), the O/S may switch to the global kernel STAB and reload the original STAB's missing PTE. Once this is done, the O/S may switch back to the original STAB and then resume the original operation.

For contextual considerations, address translation in a virtually segmented memory system requires translating a process scoped ESID into a VSID. This ESID to VSID mapping is generally provided to the processor via a segment look-aside buffer (SLB) cache located in processor, itself. The SLB size is typically small since space on a processor is limited. As a result, workloads with a large number of segments require frequent SLB reloading.

According to an embodiment, SLB entries (SLBEs) are loaded from in-memory STABs maintained by the operating system for each running process. The SLB may either be software managed by the operating system or hardware managed by the processor.

Software management of the SLB (SSLB) involves the CPU sending an SLB miss interrupt to the operating system, which then uses an interrupt handler to find or create the STAB entry (STE) containing the appropriate ESID to VSID translation information and copy it into an SLBE. SSLB allows the operating system the flexibility to choose which SLBEs get replaced. However, the SLB miss interrupt handler may take tens to hundreds of cycles to complete.

Hardware management of the SLB (HSLB) significantly reduces the SLB replacement overhead because the CPU can directly copy the STE information into an SLBE without having to send an interrupt to the operating system unless the STE needs to be created. CPU access to the STAB can either use physical or virtual addressing. Although physical addressing is easier for the processor, it imposes some limitations on the operating system's ability to optimally manage the STAB's underlying memory.

Virtually addressing the STAB removes those limitations since the operating system is free to do things such as optimizing the STAB's memory affinity by moving it to physical memory closer to the processor that's using it. However, this introduces a new problem since the CPU uses a hardware page table (HPT) entry (PTE) that translates the STE's virtual address into a physical address. If the PTE does not yet exist or has been evicted to make room for other PTEs, the CPU may send a PTE miss interrupt to the operating system requesting that PTE be reloaded. The PTE reload interrupt handler code and the internal translation tables are also accessed virtually, so the PTE reload handler may reference code/data virtual addresses whose STEs also do not have a PTE. This may cause the CPU running the PTE reload handler to recursively send another PTE miss interrupt potentially leading to an infinite loop.

An embodiment of a method exploits a virtually addressable hardware STAB that avoids that circular dependency efficiently without resorting to PTE pinning every STAB. This system eliminates the need for PTE pinning all STABs by creating a single PTE pinned global kernel STAB that contains the ESID to VSID segment table entries (STEs) needed by the PTE reload handler. The PTE reload handler will switch to that PTE pinned global kernel STAB when needed. Although switching to the PTE pinned global kernel STAB for every PTE reload request would simplify the PTE reload handler, switching to and from this PTE pinned global kernel STAB adds overhead. The number of STAB PTE reload interrupts will generally be insignificant. This is because the STABs are typically caches that are relatively small (e.g., 64 KB or 16 MB) compared to their workload's memory size (e.g., 100 s of MBs or GBs). Additionally, the CPU SLB cache may already have the ESID/VSID translations needed by the PTE reload handler. As such, even an STE PTE reload might not use the special STAB. That means a large percentage of PTE reloads do not switch to the PTE pinned global kernel STAB. The PTE pinned global kernel STAB may therefore be most efficiently used by switching to it only when actually needed.

This scenario may be accomplished by adding a small amount of code to the start of the PTE reload interrupt handler before it has enabled virtual page translation for the rest of the PTE reload interrupt handler. The new code may detect whether the interrupt was generated for a STAB PTE miss and whether it occurred while running the PTE reload interrupt handler, itself. If it did not, then no STAB switching is needed. If it did, then the handler will switch to the PTE pinned global kernel STAB and immediately resume the previously interrupted PTE reload handler. The previously interrupted PTE reload handler should now be able to complete without further STE PTE misses on its own code and data. The end of the PTE reload handler will also check whether it is using the PTE pinned global kernel STAB and switch back to the original process STAB before exiting to resume the original interrupted context.

FIG. 1 illustrates an example computing system 100 configured with global kernel STAB 160, according to one embodiment. As shown, computing system 100 includes one or more central processing units (CPUs) 1–N 105, as well as a memory 120. The CPUs 105 each include a translation lookaside buffer (TLB) 121 and a segment lookaside buffer (SLB) 122. The hardware page table 111 stores system-wide mappings between virtual addresses and physical addresses. In one embodiment, the virtual addresses in the hardware page table 111 are based on a hash of a virtual segment identifier (VSID) and virtual page number (PNO).

Each CPU 105 retrieves and executes programming instructions stored in the memory 120 as well as operates on data residing in memory 120. In one embodiment, CPU 105 is representative of the "POWER" microprocessor by IBM.

In one embodiment, the TLB 121 and the SLB 122 of the CPU 105 are lookaside buffers used to maintain recent translations of memory addresses. For instance, the SLB 122 may maintain recent translations of effective addresses to virtual addresses. In addition, the TLB 121 may maintain recent translations of virtual addresses to real addresses. In one embodiment, the hardware page table 111, per-process page tables 141 and 143, per-process segment tables 142 and 144, TLB 121, and SLB 122 may be included in a memory management unit (MMU).

As shown, the system 100 is under control of an operating system 140. Examples of operating systems include versions of the UNIX operating system (such as the AIX operating system), versions of the Microsoft Windows operating system, and distributions of the Linux operating system. (AIX is a registered trademark of Internal Business Machines. UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used.

As shown, the operating system 140 includes a page fault handler 150 that attempts to resolve page faults experienced by processes executed on the CPU 105. When the CPU 105 tries to access a location from a page that is not present in memory, the MMU may interrupt the CPU 105, which halts the process on the CPU 105. The MMU may then invoke the page fault handler 150, which receives the state information of the faulting process. The page fault handler 150 may then perform any number of operations to handle the page fault. For example, the page fault handler 150 may find where the desired page resides (e.g., on a storage device), and read the page into memory 120, or create an appropriate entry (e.g., in the page table or TLB). If the page fault handler 150 is unable to resolve the page fault and make the requested page available in memory, the offending process must be aborted. The page fault handler 150 includes code 152 to detect STAB PTE misses in PTE reload handler 152. The code 152 may detect whether an interrupt was generated for a STAB PTE miss and whether it occurred while running the PTE reload interrupt handler, itself.

In operation, the PTE reload handler may determine if a STAB PTE miss has occurred within the PTE reload handler, itself. If so the system may switch to a GK STAB and continue with the rest of the handler and switch back after loading the STAB PTE. If it there is no STAB PTE miss, then the system may use the full page fault handler 150.

FIG. 2 illustrates an example layout of an effective address 200, according to one embodiment. As shown, the effective address includes an effective segment identifier (ESID) 205, a page number (PNO) 210, and a byte offset 215. The ESID 205 specifies a segment in a process' effective address space that the effective address 200 belongs to. A given segment may include a range of addresses. For example, in a 32-bit effective address space, an ESID 205 of 0x0 may include a range of addresses 0x0000_0000 to 0x0FFF_FFFF, an ESID 205 of 0x1 may include a range of addresses 0x000_1000 to 0x1FFF FFFF, and so on.

Further, the PNO 210 specifies an index of a page within that segment. The byte offset 215 specifies an offset of a byte within that page. In practice, for a 32-bit effective address, an ESID 205 of 4 bits, a PNO 410 of 16 bits, and a byte offset 215 of 12 bits have shown to be effective. For a 64-bit effective address, an ESID 205 of 36 bits, a page number of 16 bits, and a byte offset of 12 bits has shown to be effective.

Figure 5:
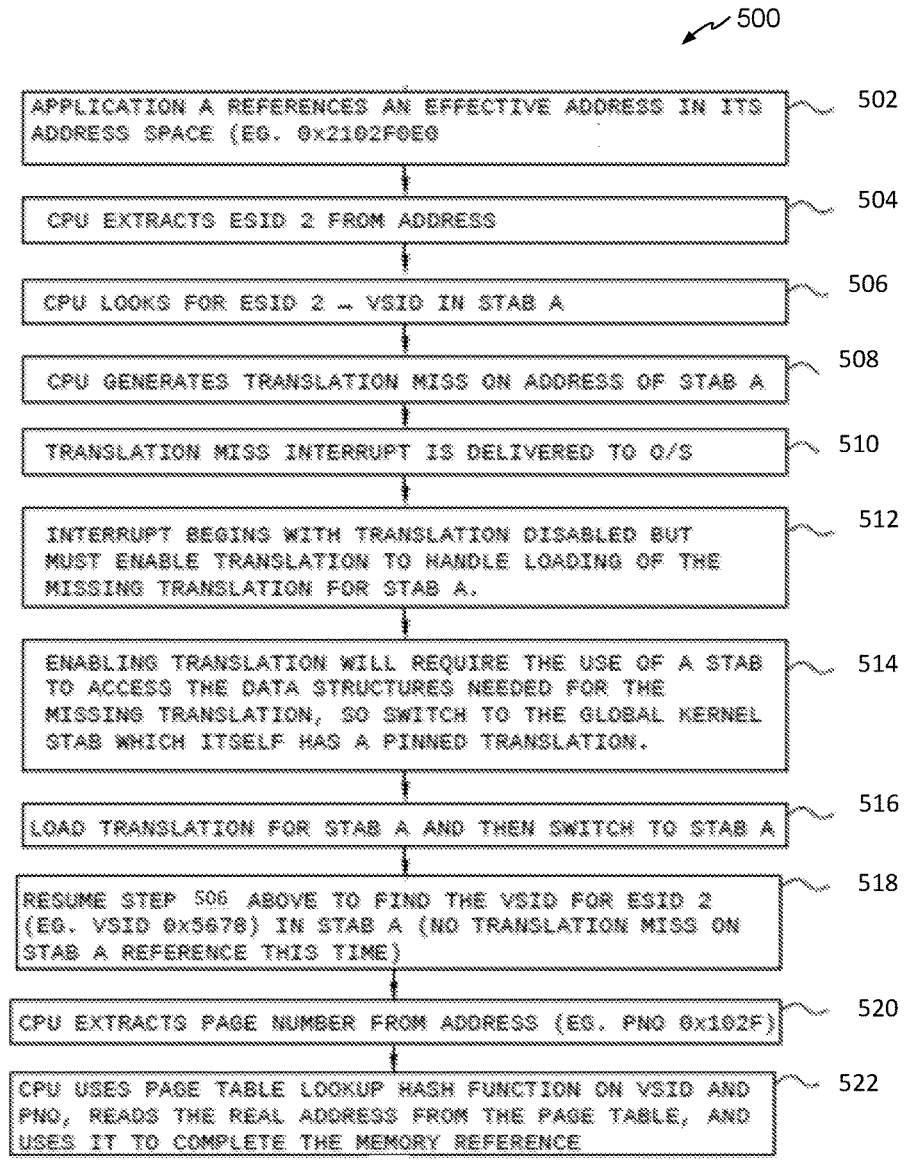
FIG. 5 is a flowchart illustrating a method to provide efficient translation reloads for page faults using a global kernel segment table (STAB) with pinned Page Table Entries (PTEs), according to one embodiment

FIG. 5 illustrates an example flow of translating an effective address to a real address, according to one embodiment. Generally, the translation occurs between three different address spaces, namely the local virtual address space (effective addresses), global virtual address space (virtual addresses), and the real (or logical) address space (real/logical addresses). According to an embodiment, if the processor in the system cannot find a translation within a STAB, the processor requests that the O/S load the translation before ESID to VSID mapping occurs.

In a first step of the process, the effective address is translated to a virtual address. The effective address may be generated by a process, and is specific to that process (via the private segment table for the process). In at least one embodiment, the kernel has its own effective address space (e.g. STAB). The CPU searches the STAB for an STE that maps the ESID to its corresponding VSID. The STAB references are performed by the CPU using virtual addressing which means it must use the STAB's VSID and PNO (from a system wide process table) to search the page table for the STAB's physical address. When the STAB does not have an entry in the page table, the CPU issues a page table entry (PTE) miss interrupt to the O/S so that it can load the STAB's PTE. Put another way, the system may detect a STAB PTE miss and switches to the global kernel STAB. The system may load the original STAB PTE and switch back to original STAB prior to resuming the original address translation.

The virtual address is part of the virtual address space, which is global to all processes (and the kernel) in the system. In the second step of the process, the virtual address is translated to a real address in memory.

For example, the system may receive a request, e.g., from a process configured to issue bus commands, to perform I/O on a given storage device attached to the system. The request may specify an effective address, as depicted by the effective address 301 of 0xF1000A8D0189008. Illustratively, the portion 'F1000A8D' represents the ESID of the effective address 301. The portion '0189' represents the PNO of the effective address 301. And the '008' portion represents the page offset of the effective address 301.

In one embodiment, the system translates the ESID of the effective address to a corresponding VSID. To do so, the system searches the STAB for an STE that maps the ESID. Doing so allows the system to determine the corresponding VSID from the STAB. As stated, the system may detect a STAB PTE miss and switches to the global kernel STAB. The system may load the original STAB PTE and switch back to original STAB prior to resuming the original address translation. Once the VSID is identified, the system performs a lookup in the page table using the VSID and PNO combination. The system then applies the byte offset in the page resulting from the lookup. As a result, the system may obtain a real address.

Figure 4:
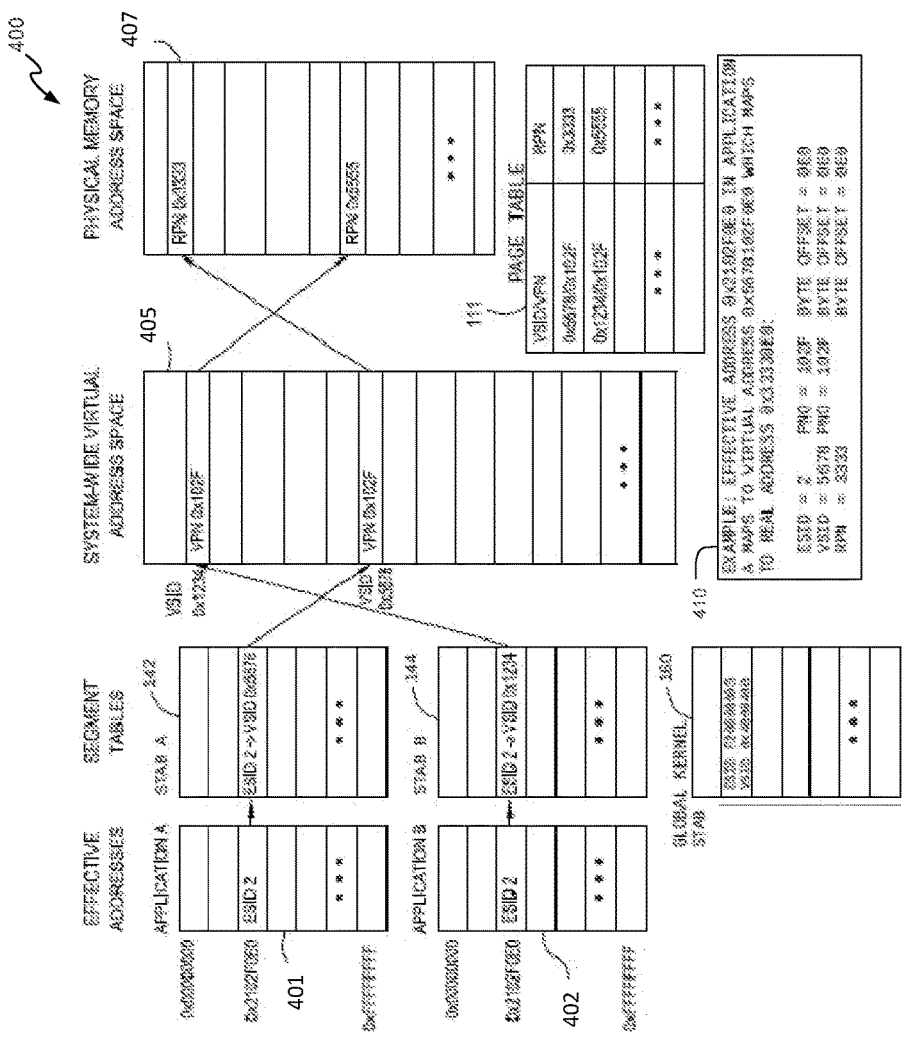
FIG. 4 illustrates an example set of address spaces, according to one embodiment.

FIG. 4 illustrates an example set of address spaces, according to one embodiment. More particularly, FIG. 4 shows main data structures involved in translating a process' effective address space to real address space. To this end, the system 400 of FIG. 4 includes a global kernel STAB 160. The global kernel STAB 160 may use a page table translation that cannot be evicted. The page table translation is used when the O/S must create a translation for the current user STAB. An embodiment of the global kernel STAB 160 may only include critical kernel ESIDs. The virtual address space of the global kernel STAB 160 has a PTE that is pinned (e.g., cannot be removed). As such, the PTE remains accessible and will not page fault. The global kernel STAB 160 may include ESID to VSID mappings for global kernel addresses that are needed to load page table entries of user STABs. The global kernel STAB 160 may only be used in critical code paths when needed, such as to load a user STAB's page table entry.

As shown, FIG. 4 depicts an effective address space 401 for an example Application A and an effective address space 402 for an example Application B. As shown, the effective address spaces 401, 402 are segmented into a plurality of segments. In one embodiment, the segments comprise 256 MB segments. The effective address spaces 401, 402 begin at effective address 0x00000000, and end at effective address 0xFFFFFFFF. As previously described, each effective address includes an ESID. As shown, therefore, Application A and Application B each have an example effective address of 0x2102F0E0. Each example effective address 0x2102F0E0 corresponds to a respective segment having an ESID=2 in address spaces 401, 402.

As shown, Application A is associated with a segment table 142 and Application B is associated with a segment table 144. The segment tables 142, 144 may also be referred to as STABs. As previously described, the segment tables 142, 144 maintain mappings between ESIDs and VSIDs. As shown, segment table 142 maps ESID 2 of application A to a VSID of 0x5678, while segment table 144 maps ESID 2 of application B to a VSID of 0x1234.

FIG. 4 also depicts a system-wide (global) virtual address space 405. As shown, the global virtual address space 405 comprises a plurality of segments, which, in one embodiment are 256 MB segments. The global virtual address space 405 shows that both VSID 0x1234 and 0x5678 include a plurality of virtual page numbers ranging from 0 to 0xFFFF (e.g., 256 MB segment with 4K pages) including VPN 0x102F.

FIG. 4 also depicts a hardware page table (HPT) 111, which maps virtual pages to their locations in real/physical memory 407. As shown, the HPT 111 may associate a VSID and VPN with a real page number (RPN). In at least one embodiment, the HPT 111 associates the result of a hash function applied to the VSID and VPN to a real page number in the physical memory address space 407. As shown, the HPT 111 associates the VSID/VPN combination of 0x5678 and 0x102F with real page number 0x3333, and the VSID/VPN combination of 0x1234 and 0x102F with real page number 0x555.

Therefore, as shown, Application A and Application B can each use the same effective address of 0x2102F0E0. However, these effective addresses are specific to each application's address space, and map to different locations in the physical memory address space 407. For example, for Application A, the ESID of 0x2102F0E0 is 2, which is used as a hash into the segment table 142, which returns a VSID of 0x5678. The VSID of 0x5678 is hashed with virtual page number 0x102F in the global virtual address space 405. The VSID of 0x5678 and VPN of 0x102F are associated with real page number 0x3333 in the hardware page table 111. In at least one embodiment, a byte offset specified in the effective address is applied to the RPN 0x3333 to return an address in the physical memory address space 407.

In operation, the global kernel STAB 160 and the other modules of FIG. 4 map an effective address 0x2102F0E0 in Application A 401 to virtual address 0x5678102F0E0. Virtual address 0x5678102F0E0 maps to real address 0x33330E0 in the physical memory address space 407. This example is summarized in the table 410 of FIG. 4.

FIG. 5 is a flowchart illustrating a method 500 to provide efficient translation reloads for page faults, according to one embodiment. Generally, the steps of the method 500 allow a system configured with a global kernel STAB with pinned PTEs to resolve page faults caused by missing page translation entries in the limited interrupt handler context, obviating the need to invoke the slower page fault handler of the operating system. The method 400 may be executed by the system 100 of FIG. 1. The description of the flowchart additionally makes reference to the illustrative set of memory spaces 400 of FIG. 4, which is discussed concurrently.

Turning more particularly to the flowchart, an application (e.g., Application A of FIG. 4) of the system may reference at 502 an effective address in its address space. For example, the Application A of FIG. 4 may access the address: 0x2102F0E0 to determine an effective address space 401.

At 504, the system may extract the ESID (e.g., ESID 2 of FIG. 4) from the effective address (e.g., address space 401 of FIG. 4). The CPU of the system at 506 may look for the ESID's corresponding VSID. For example, the processor may look for ESID 2 of FIG. 4 in STAB A 142.

Where the PTE for the STAB is not found at 506, the system may generate at 508 a translation miss on the address of the STAB. In the above example, the address is of STAB A 142. The translation miss interrupt may be delivered at 510 to the O/S. The interrupt may begin at 512 with the translation disabled, but may enable translation to handle a loading of the missing translation for the STAB (e.g., STAB A 142).

At 514, the system may switch to the global kernel STAB. Enabling translation may require the use of the global kernel STAB to access the data structures used for the missing translation. The global kernel STAB may include a pinned translation. In terms of FIG. 4, the system may load the translation at 516 for STAB A 142 and then switch to STAB A 142.

At 518, the system may resume step 506 to determine the VSID for the ESID. For example, the VSID 0x5678 of FIG. 4 may be correlated in STAB A 142. As such, there will be no translation miss on STAB A.

The CPU may extract at 520 the page number from the address. The CPU may use at 522 the page table lookup hash function on the VSID and PNO. The CPU may in this manner read the real address from the page table. For instance, the page table may be the page table 111 of FIG. 4. The real address may be used to complete the memory reference.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method of managing an address translation in a virtually segmented memory system, the method comprising:
   creating a global kernel segment table (STAB) that includes an effective address segment number (ESID) to a system wide unique virtual segment identifier (VSID) segment table entry (STE) used by a reload handler;
   initiating a switch to the global kernel STAB in response to a page fault or interrupt;
   initiating a switch to an original STAB to resume an address translation; and
   resolving the page fault or the interrupt by an operating system executing on the processor.

2. The method of claim 1, further comprising attempting the address translation using the original STAB prior to switching to the global kernel STAB.

3. The method of claim 1, wherein the global kernel STAB includes a plurality of pinned page table entries (PTEs).

4. The method of claim 3, wherein the plurality of PTEs cannot be removed and remain accessible.

5. The method of claim 1, wherein the switching in response to a page fault or interrupt further includes switching in response to the interrupt being generated for a STAB page table entry (PTE) miss.

6. The method of claim 5, further comprising determining whether the STAB PTE miss occurred while running the PTE reload interrupt handler, itself.

7. The method of claim 1, wherein the operating system resumes the address translation after the switch to the original STAB.

8. The method of claim 1, wherein the switching to the global kernel STAB is initiated by the reload handler.

9. The method of claim 8, wherein reload handler is a page table entry (PTE) reload handler.

10. The method of claim 1, further comprising adding a small amount of code to the start of the reload handler before virtual page translation has been enabled for the rest of the reload handler.

11. The method of claim 1, further comprising configuring the global kernel STAB to include only code paths that cannot handle a STAB PTE miss.

12. The method of claim 1, further comprising configuring the global kernel STAB to include only ESID to VSID mappings for global kernel addresses used to load paging table entries of STAB s.

13. The method of claim 1, further comprising accessing the global kernel STAB in response to data missing for the original STAB.

14. An apparatus comprising:
   a processor; and
   a memory storing program code executable by the processor to perform an operation comprising:
      create a global kernel segment table (STAB) that includes an effective address segment number (ESID) to a system wide unique virtual segment identifier (VSID) segment table entry (STE) used by a reload handler;
      initiate a switch to the global kernel STAB in response to a page fault or interrupt;
      initiate a switch to an original STAB to resume an address translation; and
      resolve the page fault or the interrupt by an operating system executing on the processor.

15. The apparatus of claim 14, further comprising attempting the address translation using the original STAB prior to switching to the global kernel STAB.

16. The apparatus of claim 14, wherein the global kernel STAB includes a plurality of pinned page table entries (PTEs).

17. The apparatus of claim 14, wherein the switch in response to a page fault or interrupt further includes switching in response to the interrupt being generated for a STAB page table entry (PTE) miss.

18. A computer program product comprising:
   a non-transitory computer-readable storage medium having computer-readable program code embodied therewith, the computer-readable program code executable by one or more computer processors to perform an operation comprising:
      creating a global kernel segment table (STAB) that includes an effective address segment number (ESID) to a system wide unique virtual segment identifier (VSID) segment table entry (STE) used by a reload handler;
      initiating a switch to the global kernel STAB in response to a page fault or interrupt;
      initiating a switch to an original STAB to resume an address translation; and
      resolving the page fault or the interrupt by an operating system executing on the processor.

19. The computer program product of claim 18, further comprising attempting the address translation using the original STAB prior to switching to the global kernel STAB.

20. The computer program product of claim 18, wherein the global kernel STAB includes a plurality of pinned page table entries (PTEs).

* * * * *